(No Model.)
J. W. ZIELLENBACH.
ANIMAL SECURING DEVICE.
No. 528,840. Patented Nov. 6, 1894.
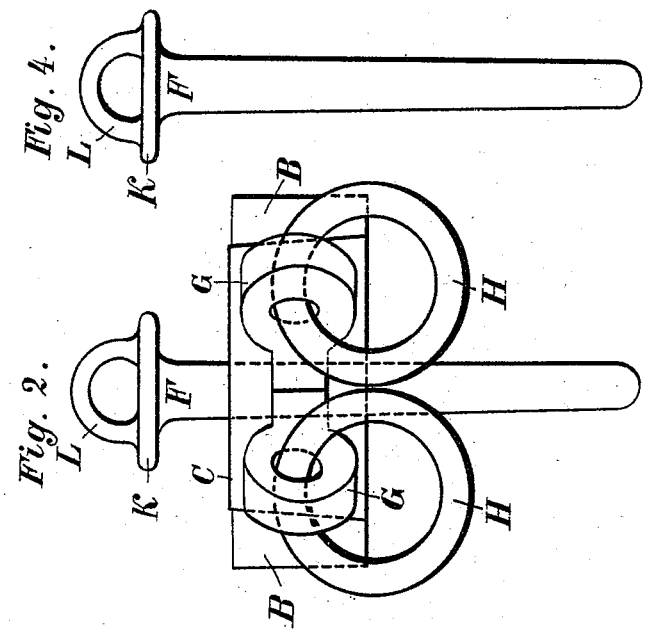
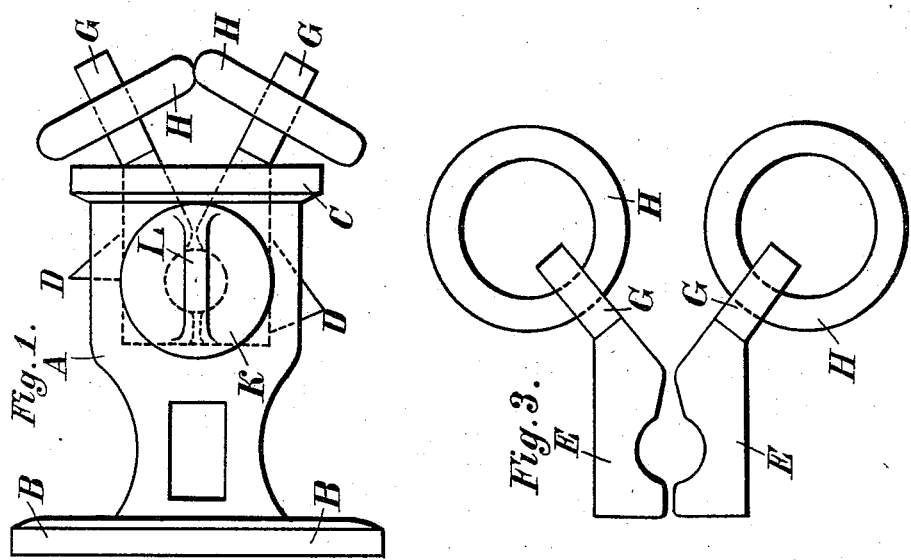
Witnesses:
Jessie D. Kingsbury.
G. A. Tauberschmidt.
Inventor:
Johann W. Ziellenbach
By Whitaker & Prevost, Attys.

UNITED STATES PATENT OFFICE.

JOHANN WILHELM ZIELLENBACH, OF CREFELD, GERMANY.

ANIMAL-SECURING DEVICE.

SPECIFICATION forming part of Letters Patent No. 528,840, dated November 6, 1894.

Application filed August 7, 1893. Serial No. 482,554. (No model.) Patented in England July 18, 1893, No. 13,891; in Belgium July 31, 1893, No. 105,537; in Austria-Hungary October 13, 1893, No. 35,249 and No. 56,228: in France October 16, 1893, No. 231,423; in Canada November 7, 1893, No. 44,642; in Switzerland November 8, 1893, No. 7,259, and in Norway August 6, 1894, No. 3,415.

*To all whom it may concern:*

Be it known that I, JOHANN WILHELM ZIELLENBACH, manufacturer, of Crefeld, in the Kingdom of Prussia, German Empire, have invented a new and useful Chained Ring-Holder for Horses and other Animals, of which the following is a specification, reference being had therein to the accompanying drawings.

My invention relates to fastenings or fittings for use in securing horses and other animals in stables or other buildings and consists in an arrangement of fastening or fitting by means of which the release of horses and other animals in case of fire or flood or other accidents or dangers, is greatly facilitated.

Letters Patent have been granted to me for the said invention in the following countries, to wit: Austria-Hungary, No. 35,249 and No. 56,228, dated October 13, 1893; Great Britain, No. 13,891, dated July 18, 1893; France, No. 231,423, dated October 16, 1893; Belgium, No. 105,537, dated July 31, 1893; Switzerland, No. 7,259, dated November 8, 1893; Norway, No. 3,415, dated August 6, 1894, and Canada, No. 44,642, dated November 7, 1893, application having also been made in Denmark under date of July 5, 1893, the patent in respect to such application having not yet been allowed.

My invention is illustrated in the accompanying drawings, in which—

Figure 1 is a plan, and Fig. 2 a partial front view of the arrangement of fastening or fitting in which my invention consists. Fig. 3 is a plan illustrating the fittings in which are secured the rings for the passage or attachment of the head chain or rope or other means by which a horse or other animal is to be secured, and Fig. 4 is a side view of the stud or pin by means of which the fittings shown in Fig. 3 are secured in the holder in which they are normally placed.

My improved fastening device consists of a socket A provided with an attaching flange B by means of which it may be secured to a wall or other suitable stationary support in any desired manner. The outer end of the socket A is provided with a recess D into which fit the shanks or connecting pieces E of a pair of rings or attaching devices H H. I prefer to form the shanks E with ring shaped portions G G engaging the rings or attaching devices H H and each of the shanks E E is provided with a semi-circular retaining notch as shown, so located that when both shanks are placed within the recess D of the socket, the said semi-circular retaining notches will come together and form a circular opening in line with a similar aperture extending entirely through the socket A transversely of its recess. A retaining pin F is then passed through the aperture in the socket A and into engagement with the notches in the shanks of the attaching devices so that the said shanks will be connected with the socket and held securely therein. The retaining pin F has a shoulder or head K which prevents the pin from going all the way through the aperture in the socket, and said pin is also provided with a loop or eye L for the attachment of a strap or cord which may be carried over suitable pulleys to a suitable point so that a pull upon the cord or strap will pull the pin F out of the socket thereby releasing the attaching devices H, H and enabling their shanks E E to be removed from the socket.

The rear face of each shank E engages the interior of the socket recess and it will therefore be seen that the pin F will hold one of the said shanks in position as well as both.

In practice the socket A is secured rigidly in the desired position in a stable and horses or other animals are secured to the attaching devices which devices are then placed with their shanks in the socket A and the retaining pin F is inserted thus securing the parts together. In case of fire or flood or other casualty or danger threatening the animals, the pin F is pulled out by means of a cord or chain or other connection as before described and the animals are instantly released.

The attaching devices can be instantly removed from the socket or replaced at any time and the device forms a convenient, strong and durable fastening.

What I claim, and desire to secure by Letters Patent, is—

In a horse securing and releasing device, the combination with the socket adapted to be secured to a wall or stationary device, and provided with a recess, and an aperture extending transversely of the recess, of a pair of horse attaching devices having each a shank for engaging said socket recess, provided with a retaining notch adapted to register with a part of said transverse aperture, and a retaining pin for engaging said aperture and the retaining notches in said shanks, for securing both shanks in said socket, substantially as described.

In witness whereof I have hereunto set my hand in presence of two witnesses.

JOHANN WILHELM ZIELLENBACH. [L. S.]

Witnesses:
EVANS BLAKE,
W. A. BLAKE.